United States Patent
Van Nieuwstadt

(10) Patent No.: US 11,313,287 B2
(45) Date of Patent: Apr. 26, 2022

(54) SYSTEM AND METHOD FOR GASPATH ACTUATORS

(71) Applicant: Ford Global Technologies, LLC, Dearborn, MI (US)

(72) Inventor: Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/036,065

(22) Filed: Sep. 29, 2020

(65) Prior Publication Data

US 2022/0099036 A1   Mar. 31, 2022

(51) Int. Cl.

| F02D 13/02 | (2006.01) |
| F02B 37/24 | (2006.01) |
| F02B 37/18 | (2006.01) |
| F02B 31/00 | (2006.01) |
| F02M 26/22 | (2016.01) |
| F02D 9/02 | (2006.01) |
| F02M 35/10 | (2006.01) |

(52) U.S. Cl.
CPC .......... *F02D 13/0249* (2013.01); *F02B 31/00* (2013.01); *F02B 37/18* (2013.01); *F02B 37/24* (2013.01); *F02D 9/02* (2013.01); *F02D 13/0223* (2013.01); *F02M 26/22* (2016.02); *F02M 35/10222* (2013.01)

(58) Field of Classification Search
CPC .... F02D 13/0249; F02D 13/0242; F02D 9/02; F02D 13/0223; F02M 26/22; F02M 35/10222; F02M 26/04; F02M 26/05; F02M 26/06; F02M 26/25; F02B 31/00; F02B 37/16; F02B 37/18; F02B 37/24; F01L 13/0005; F01L 2013/001; F01L 1/053
USPC .............. 60/605.2; 701/108; 123/90.16, 90.6
See application file for complete search history.

(56) References Cited

U.S. PATENT DOCUMENTS

| 7,516,009 | B1 * | 4/2009 | Han ................... F02D 41/0007 701/114 |
| 7,869,929 | B2 | 1/2011 | Sugihara |
| 7,899,608 | B1 * | 3/2011 | Pederson ............... G01M 15/11 701/111 |
| 8,001,782 | B2 * | 8/2011 | Pursifull ............. F02D 41/0007 60/612 |
| 8,413,441 | B2 * | 4/2013 | Pursifull ............. F02D 41/0007 60/612 |

(Continued)

FOREIGN PATENT DOCUMENTS

JP    05272344 A  * 10/1993  .............. F02B 37/00

OTHER PUBLICATIONS

Van Nieuwstadt, M., "Methods and Systems for Unsticking Engine Poppet Valves," U.S. Appl. No. 17/035,273, filed Sep. 28, 2020, 42 pages.

*Primary Examiner* — Thai Ba Trieu
(74) *Attorney, Agent, or Firm* — Geoffrey Brumbaugh; McCoy Russell LLP

(57) ABSTRACT

Methods and systems for unsticking a stuck gaspath actuator are disclosed. In one embodiment, an engine operating method includes adjusting exhaust valve timing of one or more cylinders of an engine in response to an indication that a gaspath actuator is stuck in position. In this way, pressure waves in an exhaust manifold and/or an intake manifold may be generated, which may act to unstick the gaspath actuator.

17 Claims, 7 Drawing Sheets

(56) References Cited

U.S. PATENT DOCUMENTS

| | | | | |
|---|---|---|---|---|
| 8,763,396 | B2* | 7/2014 | Oyagi | F02D 41/0007 |
| | | | | 60/612 |
| 8,788,180 | B2* | 7/2014 | Irisawa | F02D 41/0055 |
| | | | | 701/107 |
| 8,977,470 | B2* | 3/2015 | Leone | F02D 41/222 |
| | | | | 701/103 |
| 2009/0076716 | A1* | 3/2009 | Han | F02D 41/221 |
| | | | | 701/115 |
| 2015/0354442 | A1* | 12/2015 | Morelli | F02B 37/24 |
| | | | | 123/568.16 |
| 2018/0128192 | A1* | 5/2018 | Sugiyama | F02D 41/0007 |
| 2019/0136775 | A1* | 5/2019 | Dudar | F02D 41/0025 |
| 2019/0136776 | A1* | 5/2019 | Dudar | F02D 41/0055 |
| 2019/0136801 | A1* | 5/2019 | Dudar | F02D 41/123 |
| 2019/0301338 | A1* | 10/2019 | Blas Martinez | F02D 41/221 |

* cited by examiner

SYSTEM AND METHOD FOR GASPATH ACTUATORS

BACKGROUND/SUMMARY

An engine system may include an engine having a plurality of cylinders to combust fuel and deliver propulsive power to a vehicle. To control intake air flow to the cylinders, recirculation of exhaust gas back to the cylinders, turbocharger boost pressure, and other engine parameters, the engine system may include various valves, actuators, or other components that are positioned in intake and/or exhaust gaspaths, which may be termed gaspath actuators. These gaspath actuators may be exposed to relatively high levels of unburnt hydrocarbons during certain conditions. Over time, the exposure to unburnt hydrocarbons may result in actuator sticking, where an actuator may be unable to move out of position, or may not be able to move into all available actuator positions. When a gaspath actuator is determined to be stuck, the operator is typically notified of the stuck actuator so that the vehicle may be taken to be serviced and the stuck gaspath actuator mechanically repaired or replaced. Servicing the vehicle in this manner may be costly, and in some instances, the vehicle may not be operational (or fully operational) until the actuator is repaired.

The inventors herein have recognized the above-mentioned disadvantages and have developed an engine operating method, comprising: adjusting exhaust valve timing of one or more cylinders of an engine in response to an indication that a gaspath actuator is stuck in position. By adjusting the exhaust valve timing of one or more cylinders of the engine, a pressure wave may be generated in an exhaust manifold of the engine, an intake manifold of the engine, and/or both the exhaust manifold and the intake manifold, depending on the position of the gaspath actuator. The pressure wave may propagate to the gaspath actuator and may act to dislodge soot or other debris, thereby unsticking the gaspath actuator. For example, if the gaspath actuator is positioned in an exhaust system and thus is exposed to exhaust gas from the exhaust manifold (e.g., a wastegate coupled across a turbine), the exhaust valve timing may be adjusted in such a manner (e.g., early exhaust valve opening timing) as to generate a pressure wave in the exhaust manifold that is then propagated to the gaspath actuator. As another example, if the gaspath actuator is positioned in an intake system and thus is exposed to the intake manifold (e.g., an intake throttle), the exhaust valve timing may be adjusted in such a manner (e.g., holding the exhaust valves closed while the intake valves are opened during respective exhaust strokes) as to generate a pressure wave in the intake manifold that is then propagated to the gaspath actuator. As a further example, if the gaspath actuator is positioned in an exhaust gas recirculation system and thus is exposed to both the intake manifold and the exhaust manifold, the exhaust valve timing may be adjusted in such a manner (e.g., alternating durations of early exhaust valve opening and holding the exhaust valves closed) as to generate alternating pressure waves in the exhaust manifold and the intake manifold that are then propagated to the gaspath actuator.

The present description may provide several advantages. In particular, the approach may unstick the stuck gaspath actuator without demanding a manual service, which may reduce service costs and increase operator satisfaction. Further, by unsticking the stuck gaspath actuator via an on-board routine that may be performed as soon as the stuck actuator is detected (e.g., once engine operating parameters permit), the duration that the engine has lowered functionality as a result of the stuck actuator may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
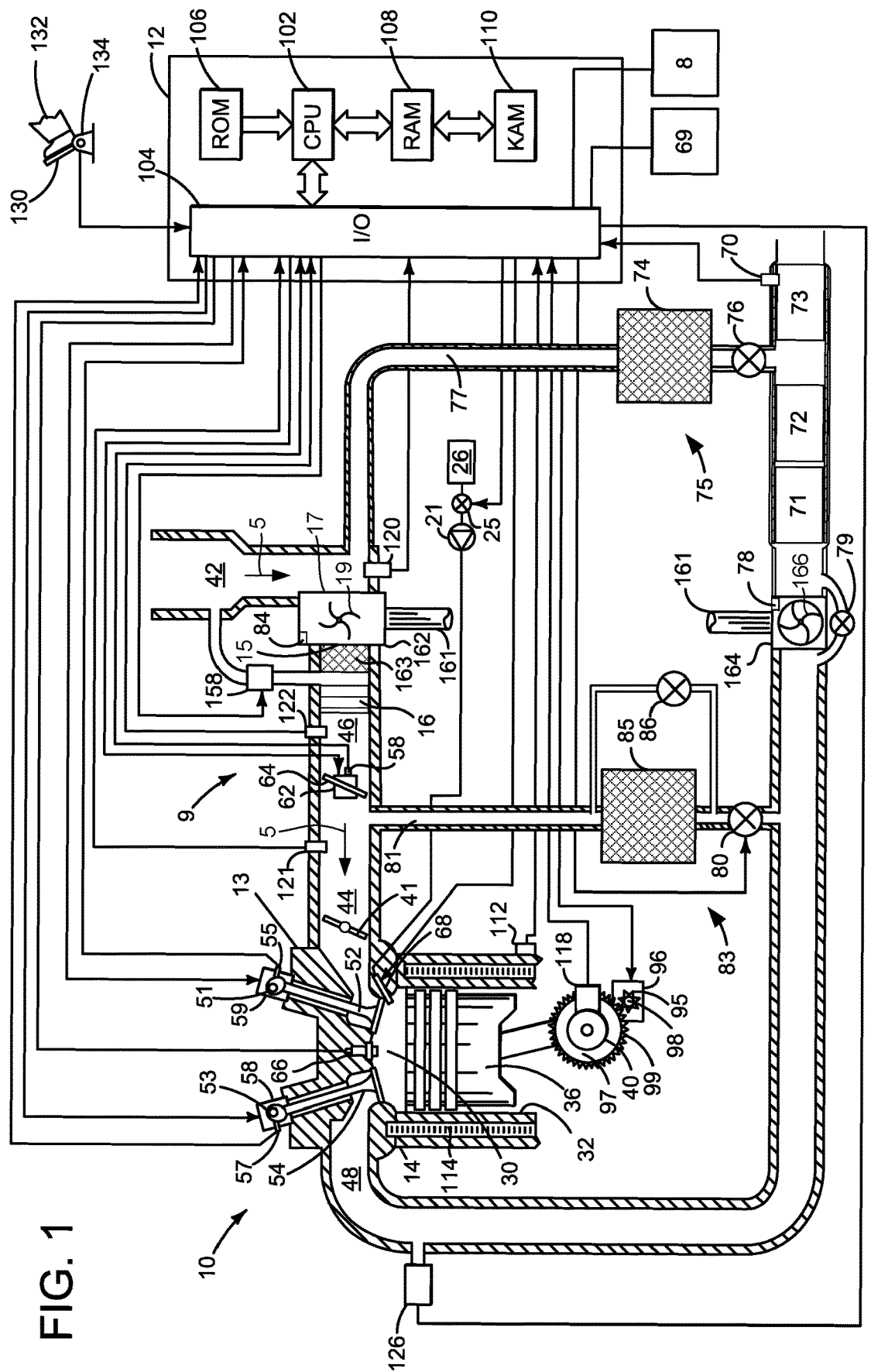
FIG. 1 shows a detailed schematic depiction of an example engine.
Figure 2:
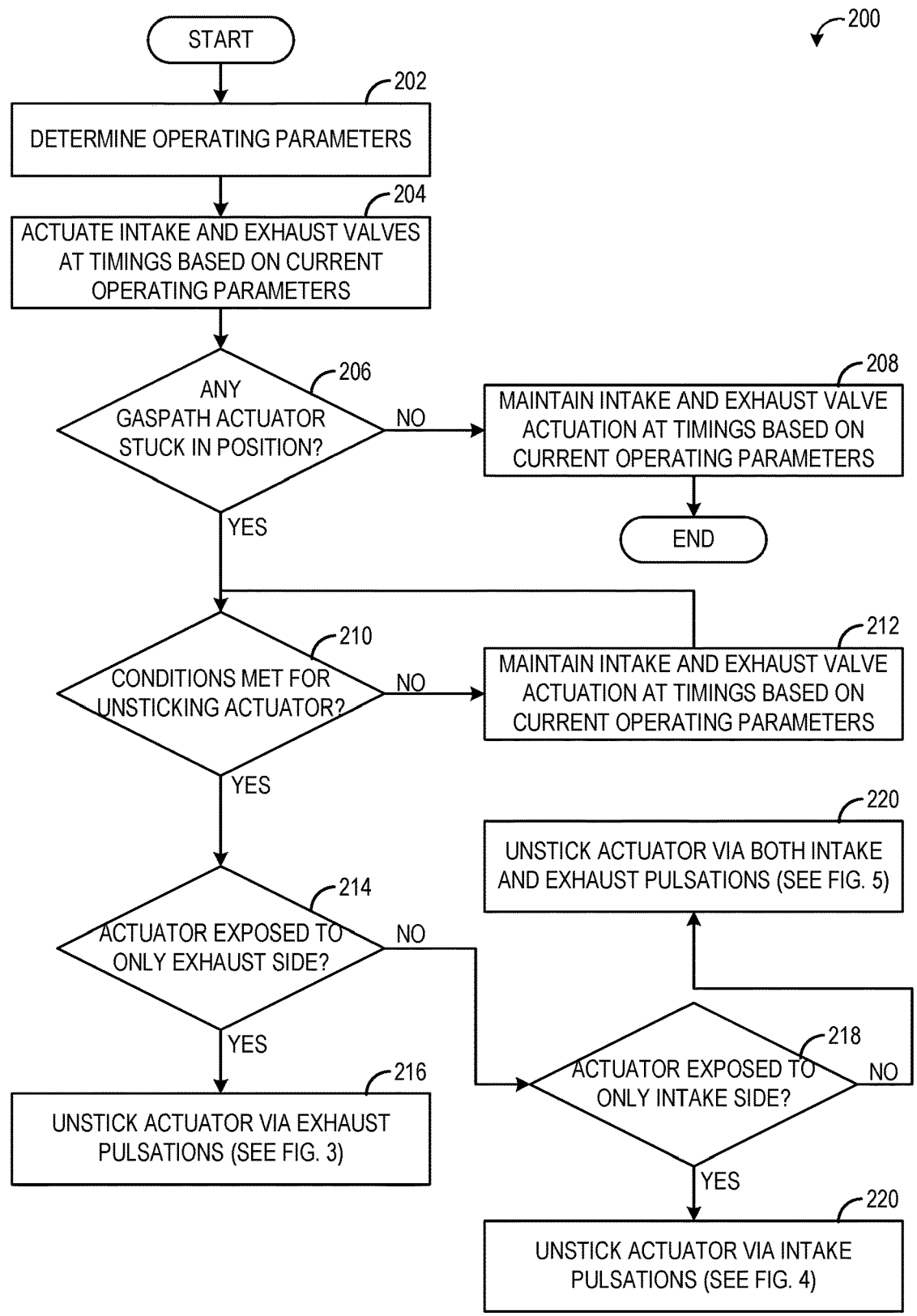
FIG. 2 is a high-level flow chart illustrating a method for unsticking a gaspath actuator.
Figure 3:
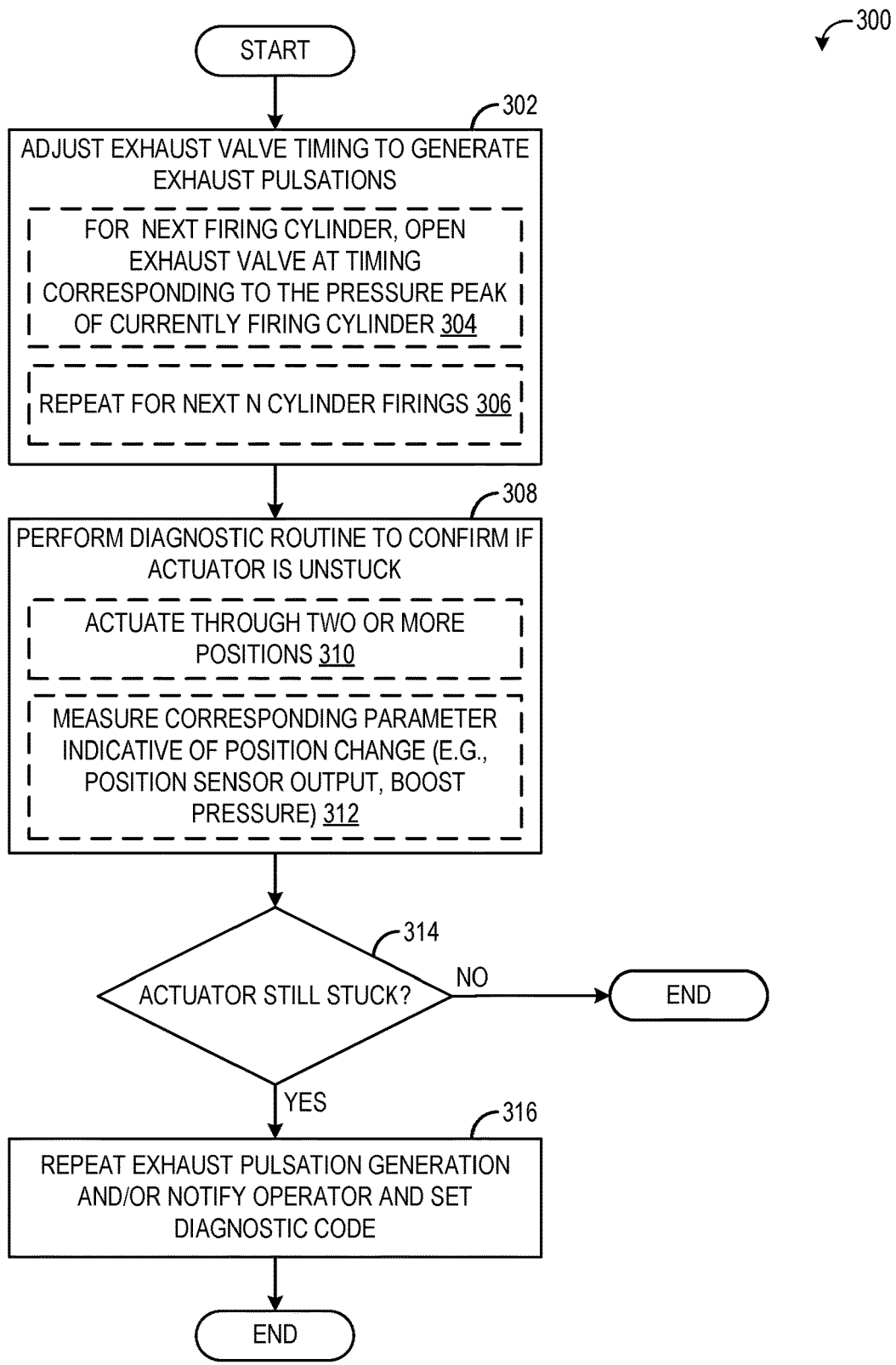
FIG. 3 is a flow chart illustrating a method for unsticking an exhaust-side gaspath actuator.
Figure 4:
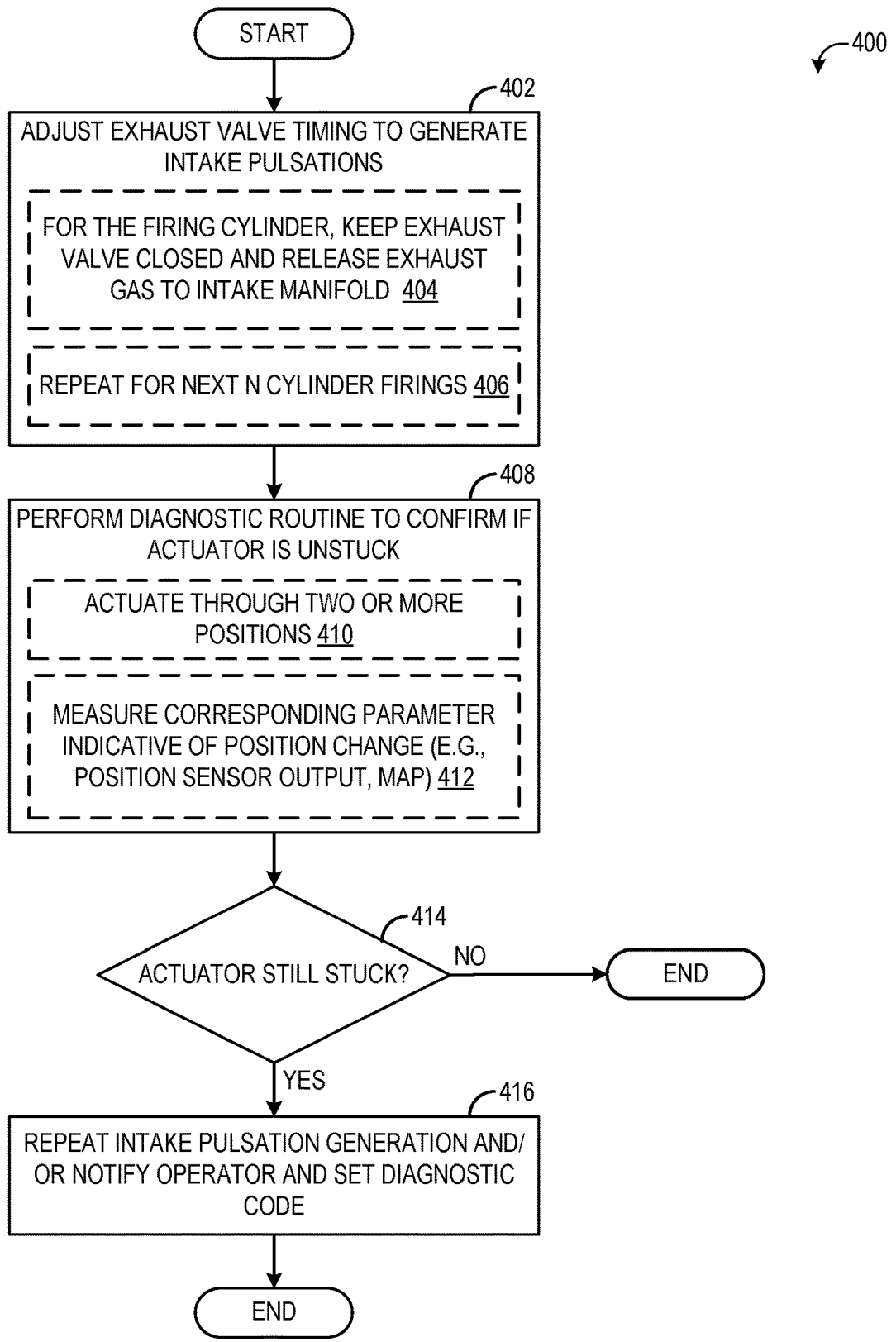
FIG. 4 is a flow chart illustrating a method for unsticking an intake-side gaspath actuator.
Figure 5:
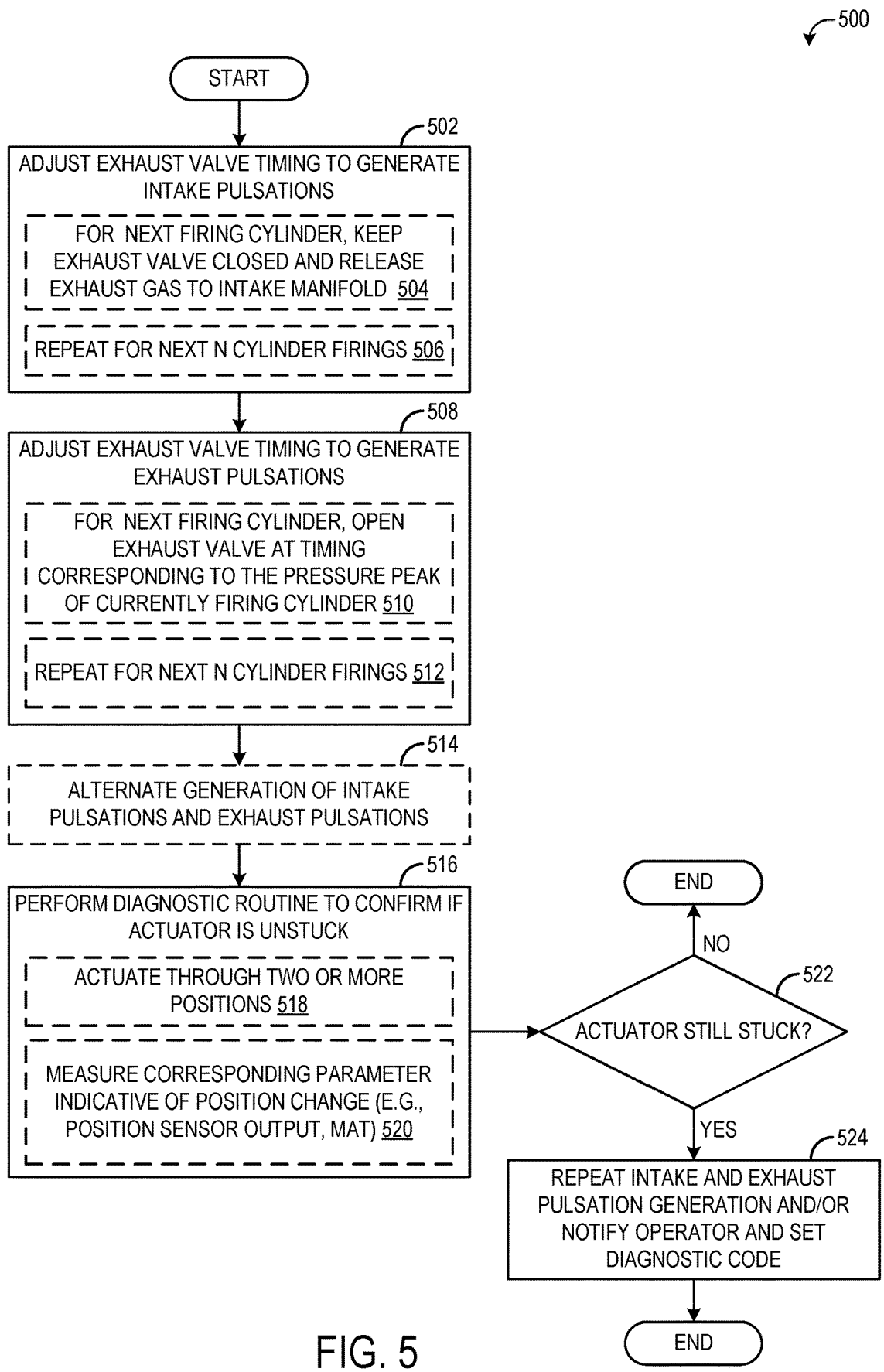
FIG. 5 is a flow chart illustrating a method for unsticking a gaspath actuator exposed to both intake and exhaust.
Figure 6:
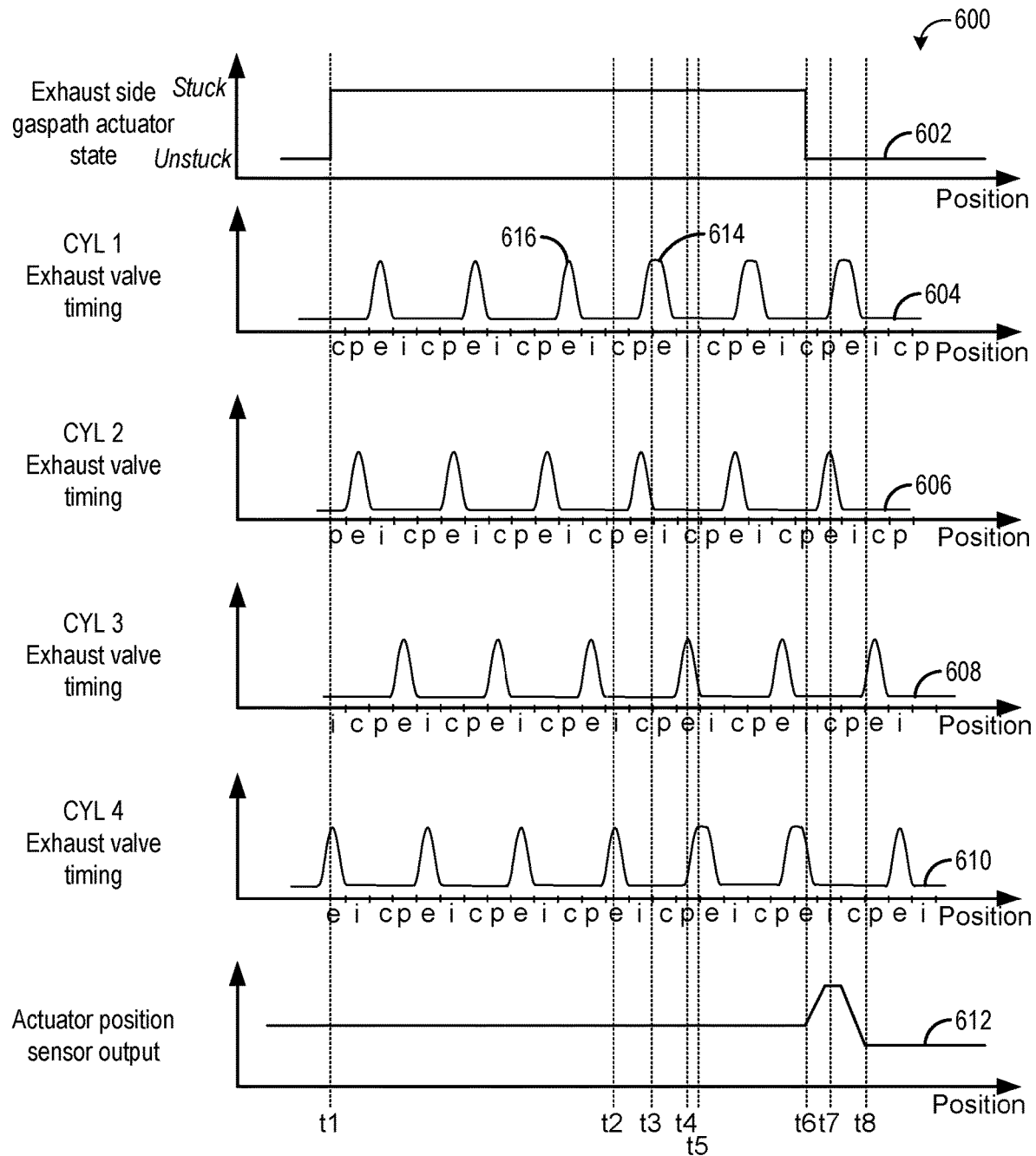
FIG. 6 shows plots of an engine operating sequence according to the method of FIG. 3.
Figure 7:
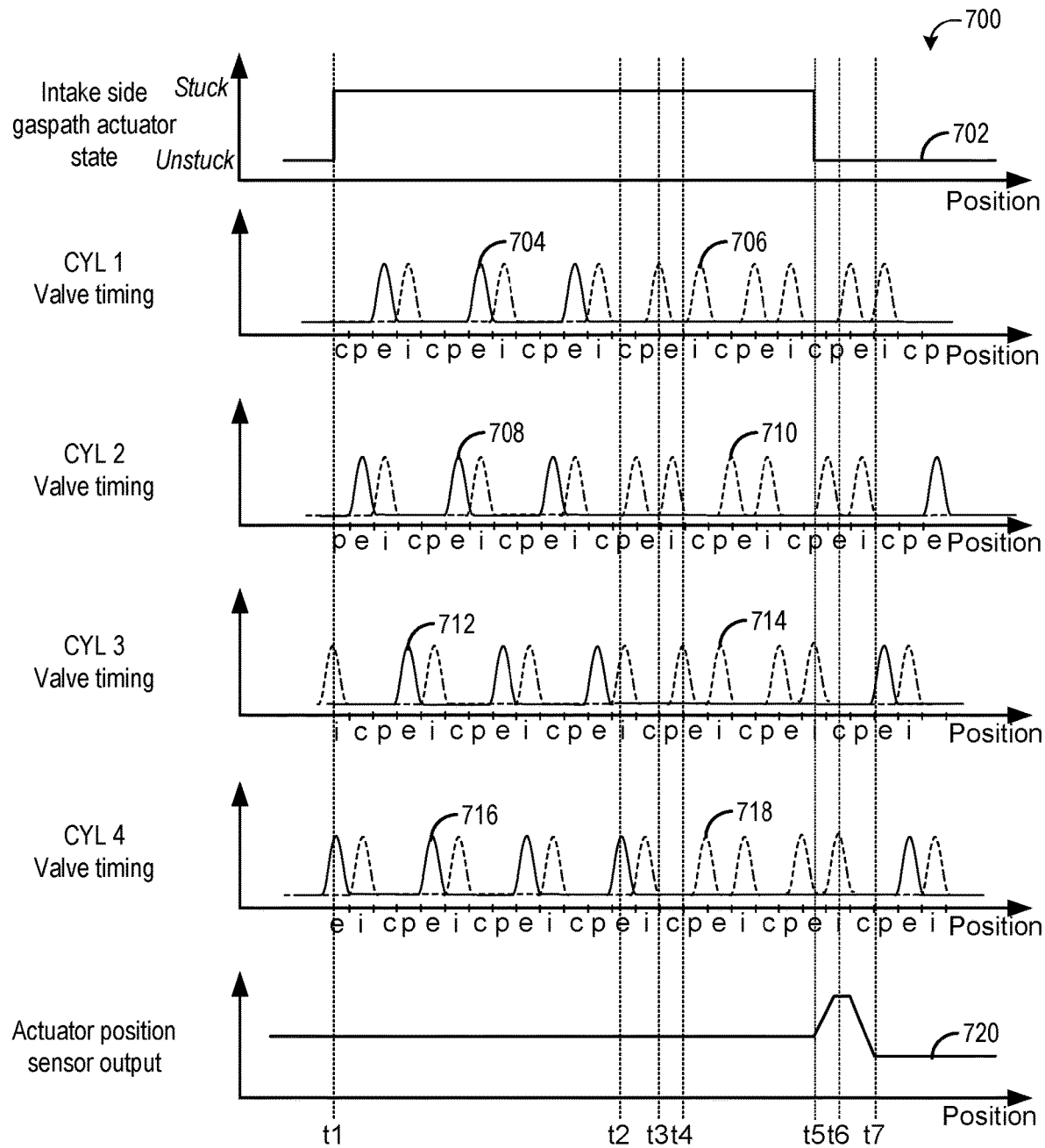
FIG. 7 shows plots of an engine operating sequence according to the method of FIG. 4.

The present description is related to operating an engine that includes one or more gaspath actuators. FIG. 1 shows one example of a boosted diesel engine having continuously variable valve lift (CVVL) that includes a plurality of gaspath actuators, including intake-side gaspath actuators, exhaust-side gaspath actuators, and intake/exhaust gaspath actuators. The CVVL may be employed to generate intake and/or exhaust pressure waves that may act to unstick a gaspath actuator when indicated. A method for operating the engine is shown in FIG. 2. The method of FIG. 2 may include unsticking an exhaust-side gaspath actuator, as shown by the method of FIG. 3, an intake-side gaspath actuator, as shown by the method of FIG. 4, or an intake/exhaust gaspath actuator, as shown by the method of FIG. 5. The engine of FIG. 1 may operate as shown in FIG. 6 according to the method of FIG. 3. The engine of FIG. 1 may operate as shown in FIG. 7 according to the method of FIG. 4.

Referring to FIG. 1, internal combustion engine 10, comprising a plurality of cylinders, one cylinder of which is shown in FIG. 1, is controlled by electronic engine controller 12. The controller 12 receives signals from the various sensors of FIGS. 1 and 2. Controller 12 employs the various actuators of FIGS. 1 and 2 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam actuation system 59 and an exhaust cam actuation system 58, respectively.

Cam actuation systems 58 and 59 each include one or more cams (such as intake cam 51 and exhaust cam 53) mounted on one or more camshafts and may utilize one or more of cam profile switching (CPS), variable cam timing (VCT), variable valve timing (VVT) and/or variable valve lift (VVL) systems (for example continuously variable valve lift, or CVVL) that may be operated by controller 12 to vary valve operation. In one example, actuation of variable valve timing and variable valve lift may be enabled by hydro-electric valve trains, such as a first electro-hydraulic valve train (not shown) that leverages pressure provided by a hydraulic medium to continuously regulate lifting of the intake valve 52. The first electro-hydraulic valve train may be positioned between the cam 51 and the intake valve 52 and operate either synchronized with or independently of the cam. The first electro-hydraulic valve train may include a higher pressure circuit and a lower pressure circuit coupled to cam actuation system 59 and used to control hydraulic pressure in the first electro-hydraulic valve train. A similar second electro-hydraulic valve train may be relied upon in similar fashion for controlling actuation of variable valve timing and variable valve lift for exhaust valve 54. While depicted as cam-actuated, in other examples the intake and/or exhaust valve(s) may be electronically actuated.

The angular position of intake and exhaust camshafts may be determined by position sensors 55 and 57, respectively. In alternative embodiments, one or more additional intake valves and/or exhaust valves of the cylinder may be controlled via electric valve actuation. For example, cylinder/combustion chamber 30 may include one or more additional intake valves controlled via electric valve actuation and one or more additional exhaust valves controlled via electric valve actuation.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Engine air intake system 9 includes intake manifold 44, throttle 62, grid heater 16, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided. Further, an optional grid heater 16 may be provided to warm air entering cylinder 30 when engine 10 is being cold started. Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. An optional electric machine may be coupled to shaft 161. Air flows into engine 10 in the direction of arrows 5. In some examples, a swirl valve 41 may be included and controlled by controller 12 to adjust the swirl/motion of the intake air before entering cylinder 30.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber next to the fuel spray, it may be easier to ignite the fuel spray plume in the cylinder, releasing heat that propagates throughout the cylinder, raising the temperature in the combustion chamber, and improving combustion. Cylinder pressure and/or temperature may be measured via an optional pressure sensor.

Emissions device 71 can include an oxidation catalyst and it may be followed by a diesel particulate filter (DPF) 72 and a selective catalytic reduction (SCR) catalyst 73, in one example. In another example, DPF 72 may be positioned downstream of SCR 73. Temperature sensor 70 provides an indication of SCR temperature.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may be cooled via passing through EGR cooler 85. EGR may bypass the EGR cooler 85 via a bypass passage coupled around the EGR cooler 85 and controlled by an EGR cooler bypass valve 86.

EGR may also be provided via low pressure EGR system 75. Low pressure EGR system 75 includes EGR passage 77 and EGR valve 76. Low pressure EGR may flow from downstream of emissions device 71 to a location upstream of compressor 162. Low pressure EGR system 75 may include an EGR cooler 74, which in some examples may also include a bypass passage and bypass valve.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122; exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a method for operating an engine is shown. In particular, a flowchart of a method for operating an internal combustion engine is shown. The method of FIG. 2 and all other methods described herein may be stored as executable instructions in non-transitory memory in systems such as shown in FIG. 1. The method of FIG. 2 (and the other methods described herein) may be incorporated into and may cooperate with the systems of FIG. 1. Further, at least portions of the method of FIG. 2 and the rest of methods described herein may be incorporated as executable instructions stored in non-transitory memory while other portions of the method(s) may be performed via a controller transforming operating states of devices and actuators in the physical world. The controller may employ engine actuators of the engine system to adjust engine operation, according to the methods described below. Further, method 200 and the other methods described herein may determine selected control parameters from sensor inputs.

At 202, method 200 determines vehicle operating conditions. Vehicle operating conditions may include but are not limited to engine temperature, accelerator pedal position, ambient temperature, engine starting requests, ambient pressure, driver demand torque, engine speed, the position of one or more gaspath actuators, etc. Vehicle operating conditions may be determined via vehicle sensors and the engine controller described in FIG. 1.

At 204, the intake valves (such as intake valve 52) and the exhaust valves (such as exhaust valve 54) are actuated at respective timings based on current operating parameters. For example, the intake valves may be actuated so that each intake valve opens during the intake stroke for the associated cylinder and the exhaust valves may be actuated so that each exhaust valve opens during the exhaust stroke for the associated cylinder. Depending on operating conditions, the intake and exhaust valves may be operated with positive valve overlap (such that an intake valve for a given cylinder opens before the exhaust valve for the given cylinder closes), negative exhaust valve overlap (such that the intake valve for the given cylinder opens only after the exhaust valve for that cylinder has fully closed), or without positive or negative valve overlap. Further, all the intake valves (or exhaust valves) of the engine may be operated with the same actuation timing, or different cylinders may operate with different intake and/or exhaust valve actuation timing. Further still, during certain conditions (such as low load conditions), one or more cylinders may be deactivated. When a cylinder is deactivated, the intake and/or exhaust valves for that cylinder may not be actuated, at least in some examples.

At 206, method 200 judges if any gaspath actuator is stuck in position. As explained above, the engine may include a plurality of gaspath actuators, which may include actuators that have at least some components (e.g., valve, plate, actuator) directly impacted by intake and/or exhaust gas.

Examples of intake-side gaspath actuators (that are in fluid contact with charge air that includes intake air and may include exhaust gas, fuel vapors, etc.) include an engine throttle (such as throttle 62), a swirl valve (such as swirl valve 41), a compressor recirculation valve (such as compressor recirculation valve 158), and a charge air cooler bypass valve. Examples of exhaust-side gaspath actuators (that are in fluid contact with exhaust gas) include a wastegate valve (such as wastegate 79) and a variable turbine geometry actuator (such as VGT actuator 78). Examples of intake/exhaust gaspath actuators (that are configured to be in fluid contact with exhaust gas during operation but are also positioned to be in fluid contact with the intake manifold) include an EGR valve (such as EGR valve 80) and an EGR cooler bypass valve (such as EGR cooler bypass valve 86).

In one example, method 200 may judge that a gaspath actuator is stuck in position in response to output from a position sensor associated with the gaspath actuator. For example, the gaspath actuator may be an EGR valve that includes a position sensor. The position sensor may generate output (e.g., a voltage signal) that changes as the position of the EGR valve changes. If the position sensor output does not change even as the commanded position of the EGR valve changes, the EGR valve may be determined to be stuck in position. Alternatively or additionally, method 200 may judge that a gaspath actuator is stuck in position in response to a prior indication of the gaspath actuator being stuck in position, which may be stored in memory (e.g., as a diagnostic code). In some examples, the gaspath actuator may be determined to be stuck in position based on a previously-performed diagnostic routine. The diagnostic routine may include commanding the gaspath actuator to two or more different positions (e.g., fully open, fully closed, partially open) and measuring a resultant engine parameter response. For example, to diagnose the EGR valve, the EGR valve may be commanded (e.g., by the controller) to the two or more different positions. At each commanded position, a parameter indicative of the EGR valve position (e.g., that is expected to change with changing EGR valve position), such as intake oxygen concentration, intake manifold pressure, or intake manifold temperature, may be measured to determine if a change in the parameter was observed. If the measured parameter (e.g., intake oxygen concentration) does not change as expected in response to a commanded valve position change (e.g., the intake oxygen concentration does not decrease after the EGR valve is moved from fully closed to fully opened), the EGR valve may be determined to be stuck in position.

It is to be appreciated that the terms "stuck in position" and "stuck gaspath actuator" are used herein to refer to a gaspath actuator that is stuck at one position, as described above, but also are used herein to refer to a gaspath actuator that cannot move through the gaspath actuator's full range of motion. For example, a gaspath actuator that can move between fully open and partially open (e.g., 50% open) but cannot move between partially open and fully closed may be considered to be "stuck in position" even though the gaspath actuator can move to some of the actuator's prescribed positions.

If method 200 judges that a gaspath actuator is stuck (e.g., any of the gaspath actuators in the engine system), the answer is yes and method 200 proceeds to 210. Otherwise, the answer is no and method 200 proceeds to 208. At 208, the intake and exhaust valve actuation may be maintained at the respective timings based on current operating parameters, and then method 200 ends. As no gaspath actuator is currently determined to be stuck in position, the current operation may be continued.

At 210, method 200 judges if conditions are met for unsticking the stuck gaspath actuator. The conditions for unsticking the gaspath actuator may be based on which gaspath actuator is stuck, as different gaspath actuators are associated with different unsticking routines, as will be explained in more detail below. For example, an exhaust-side gaspath actuator may be exposed to exhaust pressure waves to unstick the gaspath actuator, while an intake-side gaspath actuator may be exposed to intake pressure waves to unstick the gaspath actuator. As such, the conditions for unsticking an exhaust-side gaspath actuator may be different than the conditions for unsticking an intake-side gaspath actuator, at least in some examples. The conditions for unsticking an exhaust-side gaspath actuator may include conditions where a sufficient exhaust pressure wave can be generated and propagated to the exhaust-side gaspath actuator without compromising engine power or causing other issues. The conditions for unsticking an exhaust-side gaspath actuator may thus include engine speed and/or load being within a threshold range of speeds and/or loads (e.g., mid load), no active emission device regenerations occurring, the engine being warmed up, and/or other conditions. Likewise, the conditions for unsticking an intake-side gaspath actuator may include conditions where a sufficient intake pressure wave can be generated and propagated to the intake-side gaspath actuator without compromising engine power or causing other issues. The conditions for unsticking an intake-side gaspath actuator may thus include engine speed and/or load being within a threshold range of speeds and/or loads (e.g., mid load), no active fuel system purges or crankcase ventilations occurring, the engine being warmed up, and/or other conditions. The conditions for unsticking an intake/exhaust gaspath actuator may include conditions where alternating intake and exhaust pressure waves can be generated and propagated, and thus may include the same conditions as the exhaust-side and the intake-side conditions.

If method 200 judges that conditions are met for unsticking the actuator, the answer is yes and method 200 proceeds to 214. Otherwise, if the conditions for unsticking the actuator are not met, the answer is no and method 200 proceeds to 212, where the intake and exhaust valve actuation may be maintained at the respective timings based on current operating parameters, and then method 200 may continue back to monitor for the conditions being met.

At 214, method 200 judges if the stuck gaspath actuator is only exposed to gas on the exhaust side (e.g., is the stuck gaspath actuator an exhaust-side actuator). If method 200 judges that the stuck gaspath actuator is an exhaust-side actuator (e.g., a wastegate or VGT actuator), the answer is yes and method 200 proceeds to 216 to unstick the exhaust-side gaspath actuator via exhaust pulsations, according to the method of FIG. 3, which will be explained below. If method 200 judges that the stuck gaspath actuator is not an exhaust-side actuator, the answer is no and method 200 proceeds to 218 to judge if the stuck gaspath actuator is only exposed to air/gas on the intake side (e.g., is the stuck gaspath actuator an intake-side actuator). If method 200 judges that the stuck gaspath actuator is an intake-side actuator (e.g., a throttle valve or swirl valve), the answer is yes and method 200 proceeds to 220 to unstick the intake-side gaspath actuator via intake pulsations according to the method of FIG. 4, which will be explained below. If method 200 judges that the stuck gaspath actuator is not an intake-side gaspath actuator, the answer is no and method 200 proceeds to 222 to unstick the stuck gaspath actuator via both intake and exhaust pulsations, as the stuck gaspath actuator is an intake/exhaust actuator (e.g., an EGR valve or EGR cooler bypass valve) exposed to both intake air and exhaust gas, and thus beneficially can be unstuck with alternating intake and exhaust pulsations. The unsticking of the intake/exhaust gaspath actuator may be carried out according to the method of FIG. 5, which will be explained in more detail below.

FIG. 3 is a flow chart illustrating a method 300 for unsticking an exhaust-side gaspath actuator, such as a wastegate valve coupled across a turbocharger turbine (e.g., wastegate 79 of FIG. 1), a VGT actuator (e.g., VGT actuator 78), or another suitable valve that is exposed to exhaust gas and the exhaust manifold. Method 300 may be carried out in response to an indication that an exhaust-side gaspath actuator is stuck in position and further in response to an indication that current operating conditions (e.g., engine speed and load) are suitable for unsticking the actuator. In some examples, method 300 may be carried out as part of method 200, for example upon the determination at 214 of method 200 that the stuck gaspath actuator is an exhaust-side gaspath actuator.

At 302, method 300 adjusts exhaust valve timing to generate exhaust pulsations (e.g., exhaust pressure waves) that will be propagated to the stuck gaspath actuator. Adjusting the exhaust valve timing may include opening exhaust valves for one or more cylinders of the engine at an early timing (e.g., retarding exhaust valve opening timing). As indicated at 304, adjusting the exhaust valve timing may include, for the next firing cylinder, opening the exhaust valve of the next firing cylinder at a timing that corresponds to a pressure peak of a currently firing cylinder. For example, the engine may include four cylinders having a firing order of 2-1-3-4. If cylinder 2 is the currently firing cylinder, the exhaust valve for cylinder 2 may be opened at its current/non-adjusted timing (e.g., at the beginning of the exhaust stroke) and the exhaust valve timing for cylinder 1 (the next firing cylinder) may be adjusted so that the exhaust valve for cylinder 1 opens at the pressure peak resulting from the combustion in cylinder 2 (and subsequent release of exhaust gas to the exhaust manifold). Depending on current exhaust valve timing, this adjustment may include opening the exhaust valve for the next firing cylinder (e.g., cylinder 1) early, such as during the power stroke. The exhaust valve that is opened early (e.g., the exhaust valve for cylinder 1) may be closed at the prior/non-adjusted time based on operating parameters, such as at the end of the exhaust stroke, causing the exhaust valve to be open for an extended period of time, or the exhaust valve may be closed early as well.

In one example, a table or function of the timing of the pressure peak in the exhaust manifold resulting from the current firing cylinder may be stored in controller memory and the controller may adjust the exhaust valve opening timing for the next firing cylinder to coincide with or correspond to the pressure peak. The opening of the exhaust valve coinciding with (or corresponding to) the pressure peak may include the exhaust valve opening commencing at the pressure peak, or it may include the exhaust valve reaching maximum lift at the pressure peak. The table or function may be based on current operating parameters for the currently firing cylinder, e.g., fuel injection amount and timing, exhaust valve actuation timing, etc.

In some examples, each exhaust valve may be opened early, at the same timing (e.g., during the respective power stroke). In other examples, each exhaust valve may be opened at a timing based on the pressure peak of the previously fired cylinder, which may in some examples result in a progressively earlier exhaust valve opening timing as engine firing progresses. In still other examples, after opening the next firing cylinder's exhaust valve early, the method may include resuming standard/commanded exhaust valve opening timing for the next firing cylinder (e.g., for cylinder 3) and then opening the following firing cylinder's exhaust valve early (e.g., for cylinder 4). This cycle of adjusted exhaust valve timing may be repeated for the next N cylinder firings, as indicated at 306, which may act to amplify the pressure wave in the exhaust manifold. The next N cylinder firings may be a suitable, predefined number of cylinder firings, such as 10 cylinder firings, 50 cylinder firings, 100 cylinder firings, etc.

At 308, a diagnostic routine may be performed to confirm if the actuator has become unstuck, or if the actuator is still stuck in position. The diagnostic routine may include actuating the exhaust-side gaspath actuator through two or more positions, as indicated at 310. For example, the controller may send a first command to the exhaust-side gaspath actuator to move to a first position, such as fully open. After an amount of time has elapsed, the controller may send a second command to the exhaust-side gaspath actuator to move to a second, different position, such as partially closed or fully closed. The positions that the gaspath actuator is commanded to move into during the diagnostic routine may include at least one position to which the gaspath actuator was previously determined unable to move, but may also be constrained by current engine operating conditions and the function of the exhaust-side gaspath actuator, e.g., if the exhaust-side gaspath actuator is a wastegate, the exhaust-side gaspath actuator may not be able to be commanded to the fully closed position during high load conditions, as a fully closed wastegate may result in overboost.

The diagnostic routine may include measuring a corresponding parameter indicative of an actuator position change, as indicated at 312. In some examples, the parameter indicative of the actuator position change may be the output of a position sensor associated with the gaspath actuator, which may output a change in signal if the position of the gaspath actuator changes. In some examples, the parameter indicative of an actuator position change may be based on the function of the gaspath actuator. For example, when the exhaust-side gaspath actuator is a wastegate, boost pressure may be measured, as the change in the wastegate position may result in a change in boost pressure.

In some examples, the diagnostic routine may be carried out while the exhaust pulsations are being generated. For example, after the N cylinder firings have been performed, the diagnostic routine may commence while exhaust pulsations are still being generated. In other examples, the diagnostic routine may commence after the N cylinder firings have been performed and exhaust valve timing has been restored to the non-adjusted timing.

At 314, method 300 judges if the exhaust-side gaspath actuator is still stuck in position. Method 300 may judge that the exhaust-side gaspath actuator is still stuck in position if the corresponding parameter measured at 312 does not change as expected with changing commanded actuator position. For example, if the gaspath actuator position sensor continues to output a steady signal that does not change even upon a commanded actuator position change, method 300 may judge that the gaspath actuator is still stuck. Method 300 may judge that the exhaust-side gaspath actuator is not stuck if the corresponding parameter does change as expected, e.g., if the actuator position sensor output changes as the commanded actuator position changes. In some examples, the gaspath actuator may be judged to still be stuck in position if the gaspath actuator is unable to move across the entirety of the range of positions of the gaspath actuator, e.g., if the gaspath actuator can move into some but not all of the actuator's prescribed/possible positions, the gaspath actuator may be judged to still be stuck in position. In other examples, if the gaspath actuator has regained some ability to move into additional positions (e.g., positions that the actuator was unable to move into when stuck), the gaspath actuator may be considered unstuck, particularly if the gaspath actuator is able to sufficiently regulate it's prescribed gas flow (e.g., a wastage may be considered unstuck even if the wastegate cannot move into the fully open position if the wastegate can move from fully closed to at least 90% open).

If at 314 method 300 judges the actuator is not stuck, the answer is no and method 300 proceeds to end. Once the actuator is determined to be unstuck, exhaust valve timing may continue to be based on current operating parameters, and no additional pressure waves are generated in the exhaust manifold. In some examples, the diagnostic routine performed at 308 may be repeated one or more times, even after a determination that the gaspath actuator is able to move out of position, as actuation of the gaspath actuator may further assist in removing any debris or residue that may have caused the actuator to stick.

If at 314 method 300 judges the actuator is still stuck, the answer is yes and method 300 proceeds to 316 to repeat the exhaust pulsation generation one or more additional times and/or the operator may be notified of the stuck actuator, which may include setting a diagnostic code. If the controller determines that the actuator is still stuck after performing a threshold number of rounds of exhaust pulsations as described herein, the operator may be notified so that the vehicle may be taken in for service in order for the gaspath actuator to be repaired or replaced. Method 300 then ends.

FIG. 4 is a flow chart illustrating a method 400 for unsticking an intake-side gaspath actuator, such as a throttle valve positioned in an intake of the engine (e.g., throttle 62 of FIG. 1), a swirl valve (e.g., swirl valve 41), or another suitable valve that is exposed directly to intake air. Method 400 may be carried out in response to an indication that an intake-side gaspath actuator is stuck in position and further in response to an indication that current operating conditions (e.g., engine speed and load) are suitable for performing method 400 (e.g., generating intake pulsations). In some examples, method 400 may be carried out as part of method 200, for example upon the determination at 218 of method 200 that the stuck gaspath actuator is an intake-side gaspath actuator.

At 402, method 400 includes adjusting exhaust valve timing to generate intake pulsations (e.g., intake pressure waves) that will be propagated to the stuck gaspath actuator. Adjusting the exhaust valve timing may include, for the firing cylinder, keeping the exhaust valve of the firing cylinder closed and releasing the exhaust gas to the intake manifold, as indicated at 404. For example, the exhaust gas resulting from combustion in the firing cylinder may be released to the intake manifold by opening the intake valve of the firing cylinder during the exhaust stroke, while the exhaust valve for that cylinder is held closed. The closing of the exhaust valve of the firing cylinder and releasing the resultant exhaust gas to the intake manifold (e.g., via opening the intake valve of the firing cylinder during the exhaust stroke) may be repeated for the next N cylinder firings, as indicated at 406. The next N cylinder firings may be a suitable, predefined number of cylinder firings, such as 10 cylinder firings, 50 cylinder firings, 100 cylinder firings, etc.

At 408, a diagnostic routine may be performed to confirm if the actuator has become unstuck, or if the actuator is still stuck in position. The diagnostic routine may include actuating the intake-side gaspath actuator through two or more positions, as indicated at 410. For example, the controller may send a first command to the intake-side gaspath actuator to move to a first position, such as fully open. After an amount of time has elapsed, the controller may send a second command to the intake-side gaspath actuator to move to a second, different position, such as partially closed or fully closed. The positions that the gaspath actuator is commanded to move into during the diagnostic routine may include at least one position to which the gaspath actuator was previously determined unable to move, but may also be constrained by current engine operating conditions and the function of the intake-side gaspath actuator, e.g., if the intake-side gaspath actuator is a throttle, the intake-side gaspath actuator may not be able to be commanded to the fully closed position during mid to high load conditions, as a fully closed throttle may result in engine stall, operator requested torque not being delivered, etc.

The diagnostic routine may include measuring a corresponding parameter indicative of an actuator position change, as indicated at 412. In some examples, the parameter indicative of the actuator position change may be the output of a position sensor associated with the gaspath actuator, which may output a change in signal if the position of the gaspath actuator changes. In some examples, the parameter indicative of an actuator position change may be based on the function of the gaspath actuator. For example, when the intake-side gaspath actuator is a throttle, intake manifold pressure may be measured, as the change in the throttle position may result in a change in intake pressure.

In some examples, the diagnostic routine may be carried while the intake pulsations are being generated. For example, after the N cylinder firings have been performed, the diagnostic routine may commence while intake pulsations are still being generated. In other examples, the diagnostic routine may commence after the N cylinder firings have been performed and exhaust valve timing and intake valve timing have been restored to the non-adjusted timing.

At 414, method 400 judges if the intake-side gaspath actuator is still stuck in position. Method 400 may judge that the intake-side gaspath actuator is still stuck in position if the corresponding parameter measured at 412 does not change as expected with changing commanded actuator position. For example, if the gaspath actuator position sensor continues to output a steady signal that does not change even upon a commanded actuator position change, method 400 may judge that the gaspath actuator is still stuck. Method 400 may judge that the intake-side gaspath actuator is not stuck if the corresponding parameter does change as expected, e.g., if the actuator position sensor output changes as the commanded actuator position changes. In some examples, the gaspath actuator may be judged to still be stuck in position if the gaspath actuator is unable to move across the entirety of the range of positions of the gaspath actuator, e.g., if the gaspath actuator can move into some but not all of the actuator's prescribed/possible positions, the gaspath actuator may be judged to still be stuck in position. In other examples, if the gaspath actuator has regained some ability to move into additional positions (e.g., positions that the actuator was unable to move into when stuck), the gaspath actuator may be considered unstuck, particularly if the gaspath actuator is able to sufficiently regulate it's prescribed gas flow (e.g., a swirl valve may be considered unstuck even if the swirl valve cannot move into the fully open position if the swirl valve can move from fully closed to at least 90% open).

If at 414 method 400 judges the actuator is not stuck, the answer is no and method 400 proceeds to end. Once the actuator is determined to be unstuck, the exhaust valves may be activated so that each exhaust valve may be opened at a timing based on current operating parameters (e.g., during the exhaust stroke), the intake valves may be adjusted to only open once per cylinder cycle (e.g., during the respective intake stroke), and no additional pressure waves are generated in the intake manifold. In some examples, the diagnostic routine performed at 408 may be repeated one or more times, even after a determination that the gaspath actuator is able to move out of position, as actuation of the gaspath actuator may further assist in removing any debris or residue that may have caused the actuator to stick.

If at 414 method 400 judges the actuator is still stuck, the answer is yes and method 400 proceeds to 416 to repeat the intake pulsation generation one or more additional times and/or the operator may be notified of the stuck actuator, which may include setting a diagnostic code. If the controller determines that the actuator is still stuck after performing a threshold number of rounds of intake pulsations as described herein, the operator may be notified so that the vehicle may be taken in for service in order for the gaspath actuator to be repaired or replaced. Method 400 then ends.

FIG. 5 is a flow chart illustrating a method 500 for unsticking an gaspath actuator exposed to both intake air and exhaust gas (referred to as an intake/exhaust gaspath actuator), such as an EGR valve (e.g., EGR valve 80 of FIG. 1), an EGR cooler bypass valve (e.g., EGR cooler bypass valve 86), or another suitable valve that is exposed to intake air on one side and exhaust gas on the other side. Method 500 may be carried out in response to an indication that an intake/exhaust gaspath actuator is stuck in position and further in response to an indication that current operating conditions (e.g., engine speed and load) are suitable for performing method 500 (e.g., generating intake pulsations). In some examples, method 500 may be carried out as part of method 200, for example upon the determination at 218 of method 200 that the stuck gaspath actuator is an intake/exhaust gaspath actuator.

At 502, method 500 includes adjusting exhaust valve timing to generate intake pulsations (e.g., intake pressure waves) that will be propagated to the stuck gaspath actuator. Adjusting the exhaust valve timing may include, for the firing cylinder, keeping the exhaust valve of the firing cylinder closed and releasing the exhaust gas to the intake manifold, as indicated at 504. For example, the exhaust gas resulting from combustion in the firing cylinder may be released to the intake manifold by opening the intake valve of the firing cylinder during the exhaust stroke, while the exhaust valve for that cylinder is held closed. The closing of the exhaust valve of the firing cylinder and releasing the resultant exhaust gas to the intake manifold (e.g., via opening the intake valve of the firing cylinder during the exhaust stroke) may be repeated for the next N cylinder firings, as indicated at 506. The adjustment of the exhaust valve timing and intake valve timing performed at 502 to generate the intake pulsations may be the same as the adjustment to the exhaust valve and intake valve timings to generate intake pulsations as described above with respect to FIG. 4.

At 508, method 500 adjusts exhaust valve timing to generate exhaust pulsations (e.g., exhaust pressure waves) that will be propagated to the stuck gaspath actuator. Adjusting the exhaust valve timing may include, for the next firing cylinder, opening the exhaust valve of the next firing cylinder at a timing that corresponds to a pressure peak of a currently firing cylinder, as indicated at 510. For example, depending on current exhaust valve timing, this adjustment may include opening the exhaust valve for the next firing cylinder early, such as during the power stroke. The exhaust valve that is opened early may be closed at the prior time based on operating parameters, such as at the end of the exhaust stroke, causing the exhaust valve to be open for an extended period of time, or the exhaust valve may be closed early as well. In some examples, each exhaust valve may be opened early, at the same timing (e.g., during the respective power stroke). In other examples, each exhaust valve may be opened at a timing based on the pressure peak of the previously fired cylinder, which may in some examples result in a progressively earlier exhaust valve opening timing as engine firing progresses. In still other examples, after opening the next firing cylinder's exhaust valve early, the method may include resuming standard/commanded exhaust valve opening timing for the next firing cylinder and then opening the following firing cylinder's exhaust valve early. This cycle of adjusted exhaust valve timing may be repeated for the next N cylinder firings, as indicated at 512, which may act to amplify the pressure wave in the exhaust manifold. The adjustment of the exhaust valve timing performed at 508 to generate the exhaust pulsations may be the same as the adjustment to the exhaust valve timing to generate exhaust pulsations as described above with respect to FIG. 3.

The generation of the exhaust pulsations may only be performed after the intake pulsations are generated. That is, after the exhaust valves have been held closed and the exhaust gas has been released to the intake manifold for the N cylinder firings (e.g., 10, 50, or 100 cylinder firings), the control of the intake and exhaust valve timing may be shifted to generate the exhaust pulsations, and as such the exhaust valves may be actuated at the timings specified at 510 and the intake valves may be opened at the standard timing (e.g., during the intake stroke). Further, as indicated at 514, method 500 may optionally include alternating the generating of the intake pulsations and the generating of the exhaust pulsations. For example, intake pulsations may be generated for a duration (e.g., two seconds), exhaust pulsations may be generated for a duration (e.g., two seconds), then the intake pulsations may be generated again, followed by the exhaust pulsations. Further still, it is to be appreciated that the exhaust pulsations may be generated before the intake pulsations and/or that a period of time where no pulsations are generated may elapse between the intake pulsations being generated and/or the exhaust pulsations being generated.

At 516, a diagnostic routine may be performed to confirm if the actuator has become unstuck, or if the actuator is still stuck in position. The diagnostic routine may include actuating the intake/exhaust gaspath actuator through two or more positions, as indicated at 518. For example, the controller may send a first command to the intake/exhaust gaspath actuator to move to a first position, such as fully open. After an amount of time has elapsed, the controller may send a second command to the intake/exhaust gaspath actuator to move to a second, different position, such as partially closed or fully closed. The positions that the gaspath actuator is commanded to move into during the diagnostic routine may include at least one position to which the gaspath actuator was previously determined unable to move, but may also be constrained by current engine operating conditions and the function of the intake/exhaust gaspath actuator, e.g., if the intake/exhaust gaspath actuator is an EGR valve, the intake/exhaust gaspath actuator may not be able to be commanded to the fully open position during idle or engine warm-up, as delivering too much EGR during those conditions may result in engine misfire, operator requested torque not being delivered, etc.

The diagnostic routine may include measuring a corresponding parameter indicative of an actuator position change, as indicated at 520. In some examples, the parameter indicative of the actuator position change may be the output of a position sensor associated with the gaspath actuator, which may output a change in signal if the position of the gaspath actuator changes. In some examples, the parameter indicative of an actuator position change may be based on the function of the gaspath actuator. For example, when the intake/exhaust gaspath actuator is an EGR valve, intake manifold temperature (MAT) may be measured, as the change in the EGR position may result in a change in intake temperature, or the intake oxygen concentration may be measured.

In some examples, the diagnostic routine may be carried while the intake or exhaust pulsations are being generated. For example, after one or more rounds of intake and exhaust pulsations have been performed, the diagnostic routine may commence while intake or exhaust pulsations are still being generated. In other examples, the diagnostic routine may commence after the intake and exhaust pulsations have been performed and exhaust valve timing and/or intake valve timing have been restored to the non-adjusted timing.

At 522, method 500 judges if the intake/exhaust gaspath actuator is still stuck in position. Method 500 may judge that the intake/exhaust gaspath actuator is still stuck in position if the corresponding parameter measured at 520 does not change as expected with changing commanded actuator position. For example, if the gaspath actuator position sensor continues to output a steady signal that does not change even upon a commanded actuator position change, method 500 may judge that the gaspath actuator is still stuck. Method 500 may judge that the intake/exhaust gaspath actuator is not stuck if the corresponding parameter does change as expected, e.g., if the actuator position sensor output changes as the commanded actuator position changes. In some examples, the gaspath actuator may be judged to still be stuck in position if the gaspath actuator is unable to move across the entirety of the range of positions of the gaspath actuator, e.g., if the gaspath actuator can move into some but not all of the actuator's prescribed/possible positions, the gaspath actuator may be judged to still be stuck in position. In other examples, if the gaspath actuator has regained some ability to move into additional positions (e.g., positions that the actuator was unable to move into when stuck), the gaspath actuator may be considered unstuck, particularly if the gaspath actuator is able to sufficiently regulate it's prescribed gas flow (e.g., an EGR valve may be considered unstuck even if the EGR valve cannot move into the fully open position if the EGR valve can move from fully closed to at least 90% open).

If at 522 method 500 judges the actuator is not stuck, the answer is no and method 500 proceeds to end. Once the actuator is determined to be unstuck, the exhaust valves may be opened at a timing based on current operating parameters (e.g., during the exhaust stroke), the intake valves may be adjusted based on current operating parameters, e.g., to only open once per cylinder cycle during the respective intake stroke, and no additional pressure waves are generated in the intake manifold or exhaust manifold. In some examples, the diagnostic routine performed at 516 may be repeated one or more times, even after a determination that the gaspath actuator is able to move out of position, as actuation of the gaspath actuator may further assist in removing any debris or residue that may have caused the actuator to stick.

If at 522 method 500 judges the actuator is still stuck, the answer is yes and method 500 proceeds to 524 to repeat the intake and exhaust pulsation generation one or more additional times and/or the operator may be notified of the stuck actuator, which may include setting a diagnostic code. If the controller determines that the actuator is still stuck after performing a threshold number of rounds of alternating intake and exhaust pulsations as described herein, the operator may be notified so that the vehicle may be taken in for service in order for the gaspath actuator to be repaired or replaced. Method 500 then ends.

Thus, the methods described herein provide for adjustment of intake and/or exhaust valve timing in order to generate pressure waves that may assist in dislodging soot or other debris that may settle on one or more gaspath actuators. The inclusion of a variable valve actuation system, such as a continuously variable valve lift system as described above with respect to FIG. 1, may allow for the intake and/or exhaust valve timing adjustments described herein, which may not be feasible with other forms of valve timing control mechanisms. It is to be appreciated that while FIGS. 3-5 each described control of one exhaust valve and one intake valve per cylinder, in engine systems where each cylinder includes two exhaust valves and/or two intake valves, similar control of the timing of the additional exhaust valve and/or intake valve may be applied. Further, while the methods were described herein as being applicable to the engine of FIG. 1, which is a diesel engine, it is to be appreciated that the methods may be applied with other types of engine systems, such as gasoline engines, dual- or multi-fuel engines, hybrid vehicles, etc.

Referring now to FIG. 6, an example prophetic engine operating sequence 600 for an engine is shown. The operating sequence of FIG. 6 may be produced via the system of FIG. 1 executing instructions of the method described in FIGS. 2 and 3. The plots of FIG. 6 are aligned in time and occur at the same time. Vertical markers at t1-t8 indicate times of particular interest during the sequence.

The first plot from the top of FIG. 6 represents an exhaust-side gaspath actuator state versus time. Trace 602 represents exhaust-side gaspath actuator state, which may be a state of an exhaust-side gaspath actuator, such as a wastegate, with the state being either stuck or unstuck. The vertical axis represents exhaust-side gaspath actuator state. The horizontal axis represents engine position and engine position is indicated along the horizontal axis.

The second plot from the top of FIG. 6 represents a position of an exhaust valve of cylinder number one versus time. Trace 604 represents the position of the exhaust valve of cylinder number one over time. The vertical axis represents an amount of lift of the exhaust valve of cylinder number one, with lift increasing from no lift (e.g., the exhaust valve fully closed) to full lift along the direction of the vertical arrow. The horizontal axis represents engine position and time increases from the left side to right side of the figure. The vertical bars along the horizontal axis separate the strokes of cylinder number one. Cylinder number one compression stroke is indicated by c. Cylinder number one power or expansion stroke is indicated by p. Cylinder number one intake stroke is indicted by i. Cylinder number one exhaust stroke is indicated by e.

The third plot from the top of FIG. 6 represents a position of the exhaust valve of cylinder number two versus time. Trace 606 represents the position of the exhaust valve of cylinder number two over time. The vertical axis represents an amount of lift of the exhaust valve of cylinder number two, with lift increasing from no lift (e.g., the exhaust valve fully closed) to full lift along the direction of the vertical arrow. The horizontal axis represents engine position and time increases from the left side to right side of the figure. The vertical bars along the horizontal axis separate the strokes of cylinder number two. Cylinder number two compression stroke is indicated by c. Cylinder number two power or expansion stroke is indicated by p. Cylinder number two intake stroke is indicted by i. Cylinder number two exhaust stroke is indicated by e.

The fourth plot from the top of FIG. 6 represents a position of the exhaust valve of cylinder number three versus time. Trace 608 represents the position of the exhaust valve of cylinder number three over time. The vertical axis represents an amount of lift of the exhaust valve of cylinder number three, with lift increasing from no lift (e.g., the exhaust valve fully closed) to full lift along the direction of the vertical arrow. The horizontal axis represents engine position and time increases from the left side to right side of the figure. The vertical bars along the horizontal axis separate the strokes of cylinder number three. Cylinder number three compression stroke is indicated by c. Cylinder number three power or expansion stroke is indicated by p. Cylinder number three intake stroke is indicted by i. Cylinder number three exhaust stroke is indicated by e.

The fifth plot from the top of FIG. 6 represents a position of the exhaust valve of cylinder number four versus time. Trace 610 represents the position of the exhaust valve of cylinder number four over time. The vertical axis represents an amount of lift of the exhaust valve of cylinder number four, with lift increasing from no lift (e.g., the exhaust valve fully closed) to full lift along the direction of the vertical arrow. The horizontal axis represents engine position and time increases from the left side to right side of the figure. The vertical bars along the horizontal axis separate the strokes of cylinder number four. Cylinder number four compression stroke is indicated by c. Cylinder number four power or expansion stroke is indicated by p. Cylinder number four intake stroke is indicted by i. Cylinder number four exhaust stroke is indicated by e.

The third plot from the top of FIG. 6 represents a position of the exhaust valve of cylinder number two versus time. Trace 606 represents the position of the exhaust valve of cylinder number two over time. The vertical axis represents an amount of lift of the exhaust valve of cylinder number two, with lift increasing from no lift (e.g., the exhaust valve fully closed) to full lift along the direction of the vertical arrow. The horizontal axis represents engine position and time increases from the left side to right side of the figure. The vertical bars along the horizontal axis separate the strokes of cylinder number two. Cylinder number two compression stroke is indicated by C. Cylinder number two power or expansion stroke is indicated by P. Cylinder number two intake stroke is indicted by I. Cylinder number two exhaust stroke is indicated by E.

The fourth plot from the top of FIG. 6 represents a position of the exhaust valve of cylinder number three versus time. Trace 608 represents the position of the exhaust valve of cylinder number three over time. The vertical axis represents an amount of lift of the exhaust valve of cylinder number three, with lift increasing from no lift (e.g., the exhaust valve fully closed) to full lift along the direction of the vertical arrow. The horizontal axis represents engine position and time increases from the left side to right side of the figure. The vertical bars along the horizontal axis separate the strokes of cylinder number three. Cylinder number three compression stroke is indicated by C. Cylinder number three power or expansion stroke is indicated by P. Cylinder number three intake stroke is indicated by I. Cylinder number three exhaust stroke is indicated by E.

The sixth plot from the top of FIG. 6 is a plot of position sensor output for a position sensor configured to measure a position of the exhaust-side gaspath actuator. Trace 612 represents the output from the position sensor (e.g., a voltage signal) over time. The vertical axis represents the position sensor output, which increase along the direction of the vertical arrow. The horizontal axis represents engine position and time increases from the left side to right side of the figure.

Prior to time t1, the engine is operating with standard/non-adjusted exhaust valve timing. At time t1, the exhaust-side gaspath actuator becomes stuck, which is also indicated by the non-changing position sensor output (up until time t6). Between times t1 and t2, the engine continues to operate with standard/non-adjusted exhaust valve timing (e.g., based on current operating parameters that do not include the indication that the gaspath actuator is stuck). In the example shown, each exhaust valve is opened starting at the beginning of the respective exhaust stroke, reaches maximum lift during the middle of the exhaust stroke, and then closes at the end of the exhaust stroke. Each exhaust valve is fully closed between successive exhaust strokes.

At time t2, the controller determines that the exhaust-side gaspath actuator is stuck and initiates the method to unstick the exhaust-side gaspath actuator. At time t2, cylinder number two is the currently firing cylinder, as cylinder number two is undergoing combustion (e.g., is in the power stroke). Thus, the exhaust valve timing for the next-firing cylinder (which in the example shown is cylinder number one) is adjusted so that the exhaust valve for the next-firing cylinder is opened during the pressure peak in the exhaust manifold resulting from combustion and release of exhaust gas of the currently-firing cylinder (which is cylinder number two).

The pressure peak resulting from combustion in cylinder number two may occur at time t3. Thus, the exhaust valve for cylinder number one may be opened at an adjusted, early timing so that the exhaust valve for cylinder number one reaches maximum lift at time t3. The trace 604 includes an exhaust valve actuation event 614, which is the exhaust valve opening event for cylinder number one that occurs at an earlier timing than the timing of the prior exhaust valve actuation event 616 for cylinder number one. As appreciated by FIG. 6, when opened early, the exhaust valve for cylinder number one starts to open at the middle of the power stroke, rather than at the end of the power stroke/beginning of the exhaust stroke. The exhaust valve for cylinder number one may close at the same, non-adjusted time, and as a result, the valve actuation event 614 may include the exhaust valve being open for a longer duration that the prior valve actuation event 616.

The next cylinder in the engine firing order is cylinder number three. In the example shown in FIG. 6, the exhaust valve timing for cylinder number three is maintained at the standard/non-adjusted timing. Thus, the exhaust valve for cylinder number three may open just prior to time t4, reaching maximum valve lift at time t4. Cylinder number four is the next-firing cylinder, and thus the exhaust valve for cylinder number four opens early, with valve lift commencing at time t4 and reaching maximum valve lift at time t5.

The early exhaust valve opening for cylinders one and four may be repeated for one or more subsequent engine cycles, with cylinders two and three being maintained at the standard exhaust valve opening timing.

At time t6, the exhaust-side gaspath actuator may become unstuck due to the pressure pulsations impinging of the actuator and dislodging the actuator out of the stuck position. Also at time t6, the exhaust-side gaspath actuator may be commanded to a fully open position. As the gaspath actuator moves to the fully open position, the position sensor output may change and ramp toward a maximum value (indicative of the gaspath actuator being in the fully open position), which is reached at time t7. The gaspath actuator is then commanded to the fully closed position, which is reached at time t8. Thus, the gaspath actuator is actuated between at least two positions, and the actuator positon sensor output changes as expected. Accordingly, at time t8, the controller determines that the actuator is no longer stuck and resumes standard/non-adjusted exhaust valve timing for each cylinder (which is based on current operating parameters and not based on the gaspath actuator being stuck). For example, cylinder number four may have an exhaust valve actuation event after time t8 where the exhaust valve opens at the beginning of the exhaust stroke, rather than the middle of the power stroke.

Referring now to FIG. 7, an example prophetic engine operating sequence 700 for an engine is shown. The operating sequence of FIG. 7 may be produced via the system of FIG. 1 executing instructions of the method described in FIGS. 2 and 4. The plots of FIG. 7 are aligned in time and occur at the same time. Vertical markers at t1-t7 indicate times of particular interest during the sequence.

The first plot from the top of FIG. 7 represents an intake-side gaspath actuator state versus time. Trace 702 represents intake-side gaspath actuator state, which may be a state of an intake-side gaspath actuator, such as a throttle, with the state being either stuck or unstuck. The vertical axis represents intake-side gaspath actuator state. The horizontal axis represents engine position and engine position is indicated along the horizontal axis.

The second plot from the top of FIG. 7 represents positions of an exhaust valve and an intake valve of cylinder number one versus time. Trace 704 represents the position of the exhaust valve of cylinder number one, and is shown as a solid line. Trace 706 represents the position of the intake valve of cylinder one, and is shown as a dashed line. The vertical axis represents an amount of lift of the exhaust and intake valves of cylinder number one, with lift increasing from no lift (e.g., the valve fully closed) to full lift along the direction of the vertical arrow. The horizontal axis represents engine position and time increases from the left side to right side of the figure. The vertical bars along the horizontal axis separate the strokes of cylinder number one. Cylinder number one compression stroke is indicated by c. Cylinder number one power or expansion stroke is indicated by p. Cylinder number one intake stroke is indicted by i. Cylinder number one exhaust stroke is indicated by e.

The third, fourth, and fifth plots from the top of FIG. 7 represent positions of an exhaust valve and an intake valve of cylinder numbers two, three, and four, respectively, versus time. Each plot has a vertical axis that represents an amount of lift of the exhaust and intake valves of that cylinder, with lift increasing from no lift (e.g., the valve fully closed) to full lift along the direction of the vertical arrow. Each horizontal axis represents engine position and time increases from the left side to right side of the figure. The vertical bars along the horizontal axis separate the strokes of each cylinder, with compression stroke indicated by c, power or expansion stroke indicated by p, intake stroke indicted by i, and exhaust stroke indicated by e. Trace 708 represents the position of the exhaust valve of cylinder number two, and is shown as a solid line. Trace 710 represents the position of the intake valve of cylinder two, and is shown as a dashed line. Trace 712 represents the position of the exhaust valve of cylinder number three, and is shown as a solid line. Trace 714 represents the position of the intake valve of cylinder three, and is shown as a dashed line. Trace 716 represents the position of the exhaust valve of cylinder number four, and is shown as a solid line. Trace 718 represents the position of the intake valve of cylinder four, and is shown as a dashed line.

The sixth plot from the top of FIG. 7 is a plot of position sensor output for a position sensor configured to measure a position of the intake-side gaspath actuator. Trace 720 represents the output from the position sensor (e.g., a voltage signal). The vertical axis represents the position sensor output, which increases along the direction of the vertical arrow. The horizontal axis represents engine position and time increases from the left side to right side of the figure.

Prior to time t1, the engine is operating with standard/non-adjusted exhaust valve timing. At time t1, the intake-side gaspath actuator becomes stuck, which is also indicated by the non-changing position sensor output (up until time t5). Between times t1 and t2, the engine continues to operate with standard exhaust valve timing (e.g., based on current operating parameters that do not include the indication that the gaspath actuator is stuck). In the example shown, each exhaust valve is opened starting at the beginning of the respective exhaust stroke, reaches maximum lift during the middle of the exhaust stroke, and then closes at the end of the exhaust stroke. Each exhaust valve is fully closed between successive exhaust strokes. Each intake valve is opened starting at the beginning of the respective intake stroke, reaches maximum lift during the middle of the intake stroke, and then closes at the end of the intake stroke. Each intake valve is fully closed between successive intake strokes.

At time t2, the controller determines that the intake-side gaspath actuator is stuck and initiates the method to unstick the intake-side gaspath actuator. At time t2, cylinder number two is the currently firing cylinder, and thus after time t2, the exhaust valve for cylinder number two is held closed during the exhaust stroke for cylinder number two. The intake valve for cylinder number two is opened during the exhaust stroke, thus allowing the exhaust gas to be released to the intake manifold. In the example shown in FIG. 7, the intake valve is opened during the power stroke, reaching maximum lift at the end of the power stoke and beginning of the exhaust stroke (as shown by time t3, which is the intake valve actuation event during the exhaust stroke for cylinder number one), and closing before the start of the intake stoke. The intake valve is then opened again to admit intake air into the cylinder. For example, at time t3, the intake valve for cylinder number two opens; at time t4, the intake valve for cylinder number one opens.

As appreciated by trace 706, showing the intake valve actuation events for cylinder number one, the intake valve is opened prior to time t2, which is the first intake valve opening event for that cylinder cycle. The intake valve is opened for a second time during that cylinder cycle at a time prior to time t3, reaching the maximum valve lift for that intake valve opening event at time t3 and closing prior to time t4. At time t4, the intake valve is opened for the next cylinder cycle. In this way, during the method to unstick the intake-side gaspath actuator, the exhaust valves are all held shut, and each intake valve opens twice during each cylinder cycle. Accordingly, between successive intake strokes for a cylinder, the intake valve for that cylinder is opened in order to release exhaust gas to the intake manifold.

In the example shown in FIG. 7, from time t2 to time t7 (e.g., during the method to unstick the gaspath actuator), each intake valve during each intake valve actuation event is opened with the same amount of lift and for the same duration. In other words, the additional intake valve actuation events performed to release the exhaust gas to the intake manifold are full actuation events with a full amount of valve lift and duration. However, in other examples, the duration and/or lift of the additional intake valve actuation events performed to release the exhaust gas to the intake manifold may differ from the intake valve lift and/or duration of the intake valve actuation events performed during the intake stroke, such as having a smaller amount of lift or being open for a shorter duration.

At time t5, the intake-side gaspath actuator becomes unstuck due to the pressure pulsations impinging on the actuator and dislodging the actuator out of the stuck position. Also at time t5, the intake-side gaspath actuator may be commanded to a fully open position. As the gaspath actuator moves to the fully open position, the position sensor output may change and ramp toward a maximum value (indicative of the gaspath actuator being in the fully open position), which is reached at time t6. The gaspath actuator is then commanded to the fully closed position, which is reached at time t7. Thus, the gaspath actuator is actuated between at least two positions, and the actuator positon sensor output changes as expected. Accordingly, at time t7, the controller determines that the actuator is no longer stuck and resumes standard exhaust valve and intake valve timing for each cylinder. For example, cylinder number four may have an exhaust valve actuation event after time t7 where the exhaust valve opens during the exhaust stroke, rather than the intake valve.

An engine operating method is provided, including adjusting exhaust valve timing of one or more cylinders of an engine in response to an indication that a gaspath actuator is stuck in position. In a first example of the method, the gaspath actuator is an exhaust-side gaspath actuator, and wherein adjusting the exhaust valve timing comprises retarding exhaust valve opening timing of the one or more cylinders to generate a pressure wave in an exhaust manifold of the engine. In a second example of the method, optionally including the first example, retarding the exhaust valve opening timing comprises, for a next-firing cylinder following a currently-firing cylinder in an engine firing order, opening an exhaust valve of the next-firing cylinder at a timing corresponding to a pressure peak in the exhaust manifold of the engine resulting from combustion in the currently-firing cylinder. In a third example of the method, optionally including one or both of the first and second examples, the exhaust-side gaspath actuator comprises a variable geometry turbine actuator or a wastegate coupled across a turbocharger turbine. In a fourth example of the method, optionally including one or more or each of the first through third examples, the gaspath actuator is an intake-side gaspath actuator, and wherein adjusting the exhaust valve timing comprises holding each exhaust valve of each of the one or more cylinders closed during a respective exhaust stroke and releasing exhaust gas to an intake manifold of the engine to generate a pressure wave in the intake manifold. In a fifth example of the method, optionally including one or more or each of the first through fourth examples, releasing the exhaust gas to the intake manifold comprises opening each intake valve of each of the one or more cylinders during a respective exhaust stroke. In a sixth example of the method, optionally including one or more or each of the first through fifth examples, the intake-side gaspath actuator comprises a throttle valve or a swirl valve. In a seventh example of the method, optionally including one or more or each of the first through sixth examples, the gaspath actuator is an intake/exhaust gaspath actuator, and wherein adjusting the exhaust valve timing comprises performing alternating rounds of different exhaust valve timing adjustments to generate pressure waves in an exhaust manifold of the engine and an intake manifold of the engine. In an eighth example of the method, optionally including one or more or each of the first through seventh examples, performing alternating rounds of different exhaust valve timing adjustments to generate pressure waves in the exhaust manifold of the engine and the intake manifold of the engine comprises first retarding exhaust valve opening timing of the one or more cylinders to generate a pressure wave in the exhaust manifold of the engine and then holding each exhaust valve of each of the one or more cylinders closed during respective exhaust strokes and releasing exhaust gas to the intake manifold to generate a pressure wave in the intake manifold. In a ninth example of the method, optionally including one or more or each of the first through eighth examples, the intake/exhaust gaspath actuator comprises an exhaust gas recirculation valve or an exhaust gas recirculation cooler bypass valve. In a tenth example of the method, optionally including one or more or each of the first through ninth examples, the method further includes resuming a non-adjusted exhaust valve timing after a threshold number of cylinder firings has elapsed and/or after receiving an indication that the gaspath actuator is no longer stuck in position, where the non-adjusted exhaust valve timing is based on current engine operating parameters that do not include whether or not the gaspath actuator is stuck in position.

An engine system is provided, including an engine including a plurality of cylinders, each cylinder having a respective intake valve and a respective exhaust valve; a gaspath actuator; and a controller including executable instructions stored in non-transitory memory to, in response to an indication that the gaspath actuator is stuck in a position, adjust an opening timing and/or a closing timing of one or more of the respective exhaust valves. In a first example of the system, the gaspath actuator is a variable geometry turbine actuator or a wastegate coupled across a turbocharger turbine, and wherein adjusting the opening timing and/or the closing timing of one or more of the respective exhaust valves comprises retarding an opening timing of one or more of the respective exhaust valves to generate a pressure wave in an exhaust manifold of the engine. In a second example of the system, optionally including the first example, the gaspath actuator is a throttle valve or an intake swirl valve, and wherein adjusting the opening timing and/or the closing timing of one or more of the respective exhaust valves comprises holding each exhaust valve of each cylinder closed during a respective exhaust stroke and releasing exhaust gas to an intake manifold of the engine to generate a pressure wave in the intake manifold. In a third example of the system, optionally including one or both of the first and second examples, the gaspath actuator is an exhaust gas recirculation valve or an exhaust gas recirculation cooler bypass valve, and wherein adjusting the opening timing and/or the closing timing of one or more of the respective exhaust valves comprises performing alternating rounds of different opening timings and/or the closing timings of one or more of the respective exhaust valves to generate pressure waves in an exhaust manifold of the engine and an intake manifold of the engine. In a fourth example of the system, optionally including one or more or each of the first through third examples, performing alternating rounds of different opening timings and/or closing timings of one or more of the respective exhaust valves to generate pressure waves in the exhaust manifold of the engine and the intake manifold of the engine comprises first retarding exhaust valve opening timing of the one or more cylinders to generate a pressure wave in the exhaust manifold of the engine and then holding each exhaust valve of each of the one or more cylinders closed during respective exhaust strokes and releasing exhaust gas to the intake manifold to generate a pressure wave in the intake manifold.

A method is provided, including determining that a gaspath actuator of an engine system is stuck in position; and in response to the determining, generating one or more pressure waves in an exhaust manifold of an engine of the engine system and/or an intake manifold of the engine and propagating the one more pressure waves to the gaspath actuator. In a first example of the method, generating one or more pressure waves in the exhaust manifold of the engine and/or the intake manifold of the engine comprises generating one or more pressure waves in the exhaust manifold by retarding an opening timing of one or more respective exhaust valves of the engine. In a second example of the method, optionally including the first example, generating one or more pressure waves in the exhaust manifold of the engine and/or the intake manifold of the engine comprises generating one or more pressure waves in the intake manifold by holding each exhaust valve of each cylinder of the engine closed during a respective exhaust stroke and releasing exhaust gas to the intake manifold. In a third example of the method, optionally including one or both of the first and second examples, the gaspath actuator comprises an exhaust gas recirculation valve, an exhaust gas recirculation cooler bypass valve, a swirl valve, a throttle valve, a wastegate, or a variable geometry turbine actuator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method executable by a controller, comprising:
   adjusting exhaust valve timing of one or more cylinders of an engine in response to an indication that a gaspath actuator is stuck in position; and
   resuming a non-adjusted exhaust valve timing after a threshold number of cylinder firings has elapsed and/or after receiving an indication that the gaspath actuator is no longer stuck in position, where the non-adjusted exhaust valve timing is based on current engine operating parameters that do not include whether or not the gaspath actuator is stuck in position.

2. The method of claim 1, wherein the gaspath actuator is an exhaust-side gaspath actuator, and wherein adjusting the exhaust valve timing comprises retarding exhaust valve opening timing of the one or more cylinders to generate a pressure wave in an exhaust manifold of the engine.

3. The method of claim 2, wherein retarding the exhaust valve opening timing comprises, for a next-firing cylinder following a currently-firing cylinder in an engine firing order, opening an exhaust valve of the next-firing cylinder at a timing corresponding to a pressure peak in the exhaust manifold of the engine resulting from combustion in the currently-firing cylinder.

4. The method of claim 2, wherein the exhaust-side gaspath actuator comprises a variable geometry turbine actuator or a wastegate coupled across a turbocharger turbine.

5. The method of claim 1, wherein the gaspath actuator is an intake-side gaspath actuator, and wherein adjusting the exhaust valve timing comprises holding each exhaust valve of each of the one or more cylinders closed during a respective exhaust stroke and releasing exhaust gas to an intake manifold of the engine to generate a pressure wave in the intake manifold.

6. The method of claim 5, wherein releasing the exhaust gas to the intake manifold comprises opening each intake valve of each of the one or more cylinders during a respective exhaust stroke.

7. The method of claim 5, wherein the intake-side gaspath actuator comprises a throttle valve or a swirl valve.

8. The method of claim 1, wherein the gaspath actuator is an intake/exhaust gaspath actuator, and wherein adjusting the exhaust valve timing comprises performing alternating rounds of different exhaust valve timing adjustments to generate pressure waves in an exhaust manifold of the engine and an intake manifold of the engine.

9. The method of claim 8, wherein performing alternating rounds of different exhaust valve timing adjustments to generate pressure waves in the exhaust manifold of the engine and the intake manifold of the engine comprises first retarding exhaust valve opening timing of the one or more cylinders to generate a pressure wave in the exhaust manifold of the engine and then holding each exhaust valve of each of the one or more cylinders closed during respective exhaust strokes and releasing exhaust gas to the intake manifold to generate a pressure wave in the intake manifold.

10. The method of claim 8, wherein the intake/exhaust gaspath actuator comprises an exhaust gas recirculation valve or an exhaust gas recirculation cooler bypass valve.

11. An engine system, comprising:
an engine including a plurality of cylinders, each cylinder having a respective intake valve and a respective exhaust valve;
a gaspath actuator comprising an exhaust gas recirculation valve or an exhaust gas recirculation cooler bypass valve; and
a controller including executable instructions stored in non-transitory memory to, in response to an indication that the gaspath actuator is stuck in a position, adjust an opening timing and/or a closing timing of one or more of the respective exhaust valves, including selectively performing alternating rounds of different opening timings and/or the closing timings of one or more of the respective exhaust valves to generate pressure waves in an exhaust manifold of the engine and an intake manifold of the engine.

12. The system of claim 11, wherein the system further comprises a variable geometry turbine actuator or a wastegate coupled across a turbocharger turbine, and wherein the instructions further comprise instructions to retard an opening timing of one or more of the respective exhaust valves to generate a pressure wave in an exhaust manifold of the engine in response to an indication that the variable geometry turbine actuator or the wastegate is stuck in a position.

13. The system of claim 11, wherein the system further comprises a throttle valve or an intake swirl valve, and wherein the instructions further comprise instructions to hold each exhaust valve of each cylinder closed during a respective exhaust stroke and releasing exhaust gas to an intake manifold of the engine to generate a pressure wave in the intake manifold in response to an indication that the throttle valve or the intake swirl valve is stuck in a position.

14. The system of claim 11, wherein performing alternating rounds of different opening timings and/or closing timings of one or more of the respective exhaust valves to generate pressure waves in the exhaust manifold of the engine and the intake manifold of the engine comprises first retarding exhaust valve opening timing of the one or more cylinders to generate a pressure wave in the exhaust manifold of the engine and then holding each exhaust valve of each of the one or more cylinders closed during respective exhaust strokes and releasing exhaust gas to the intake manifold to generate a pressure wave in the intake manifold.

15. A method executable by a controller, comprising:
determining that a gaspath actuator of an engine system is stuck in position; and
in response to the determining, generating one or more pressure waves in an exhaust manifold of an engine of the engine system and/or an intake manifold of the engine and propagating the one more pressure waves to the gaspath actuator, including generating one or more pressure waves in the intake manifold by holding each exhaust valve of each cylinder of the engine closed during a respective exhaust stroke and releasing exhaust gas to the intake manifold.

16. The method of claim 15, wherein the one or more pressure waves in the intake manifold are generated during a first condition, wherein the gaspath actuator is a first gaspath actuator, and further comprising determining during a second condition that a second gaspath actuator is stuck in position, and in response, generating one or more pressure waves in the exhaust manifold by retarding an opening timing of one or more respective exhaust valves of the engine.

17. The method of claim 15, wherein the gaspath actuator comprises an exhaust gas recirculation valve, an exhaust gas recirculation cooler bypass valve, a swirl valve, a throttle valve, a wastegate, or a variable geometry turbine actuator.

* * * * *